June 6, 1950 G. V. JOHNSON 2,510,636
VEHICLE MOUNTED CRANE
Filed July 6, 1945 3 Sheets-Sheet 1
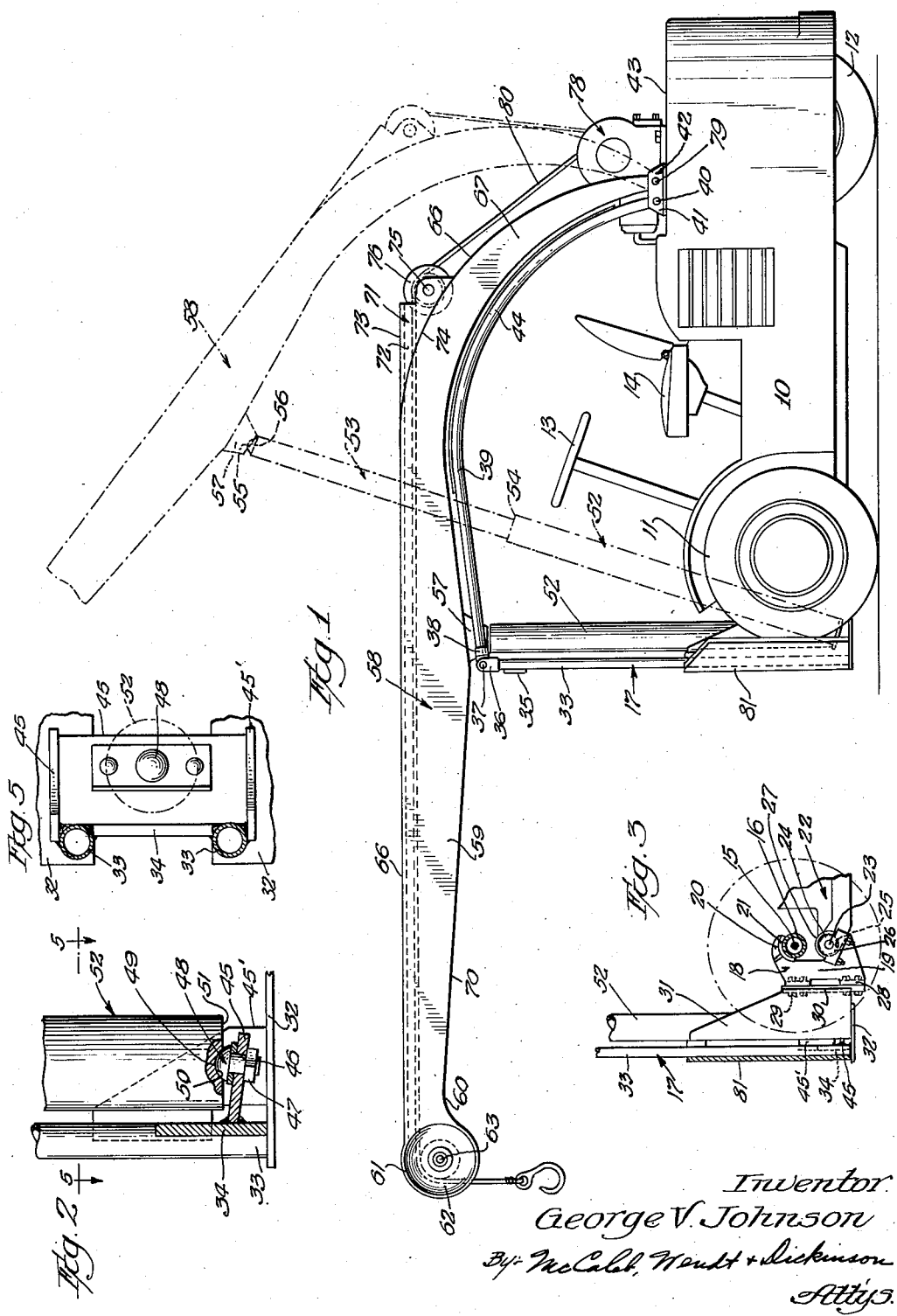
Inventor
George V. Johnson
By McCaleb, Wendt + Dickinson
Attys.

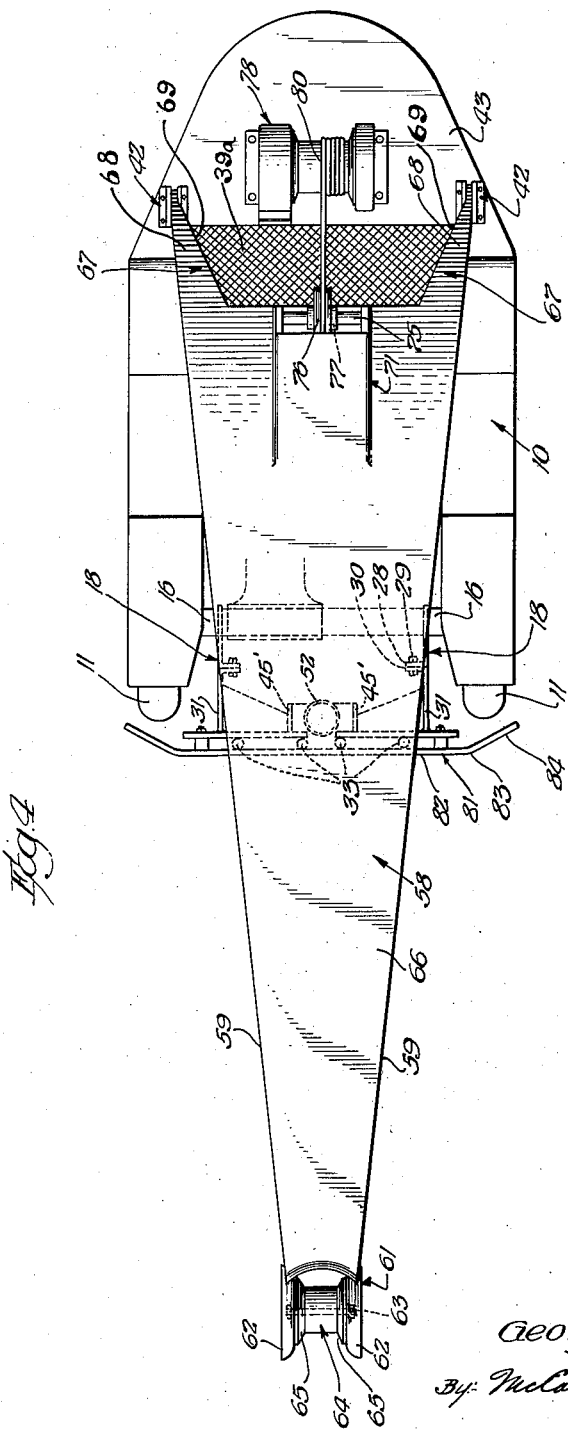

June 6, 1950  G. V. JOHNSON  2,510,636
VEHICLE MOUNTED CRANE
Filed July 6, 1945  3 Sheets-Sheet 3
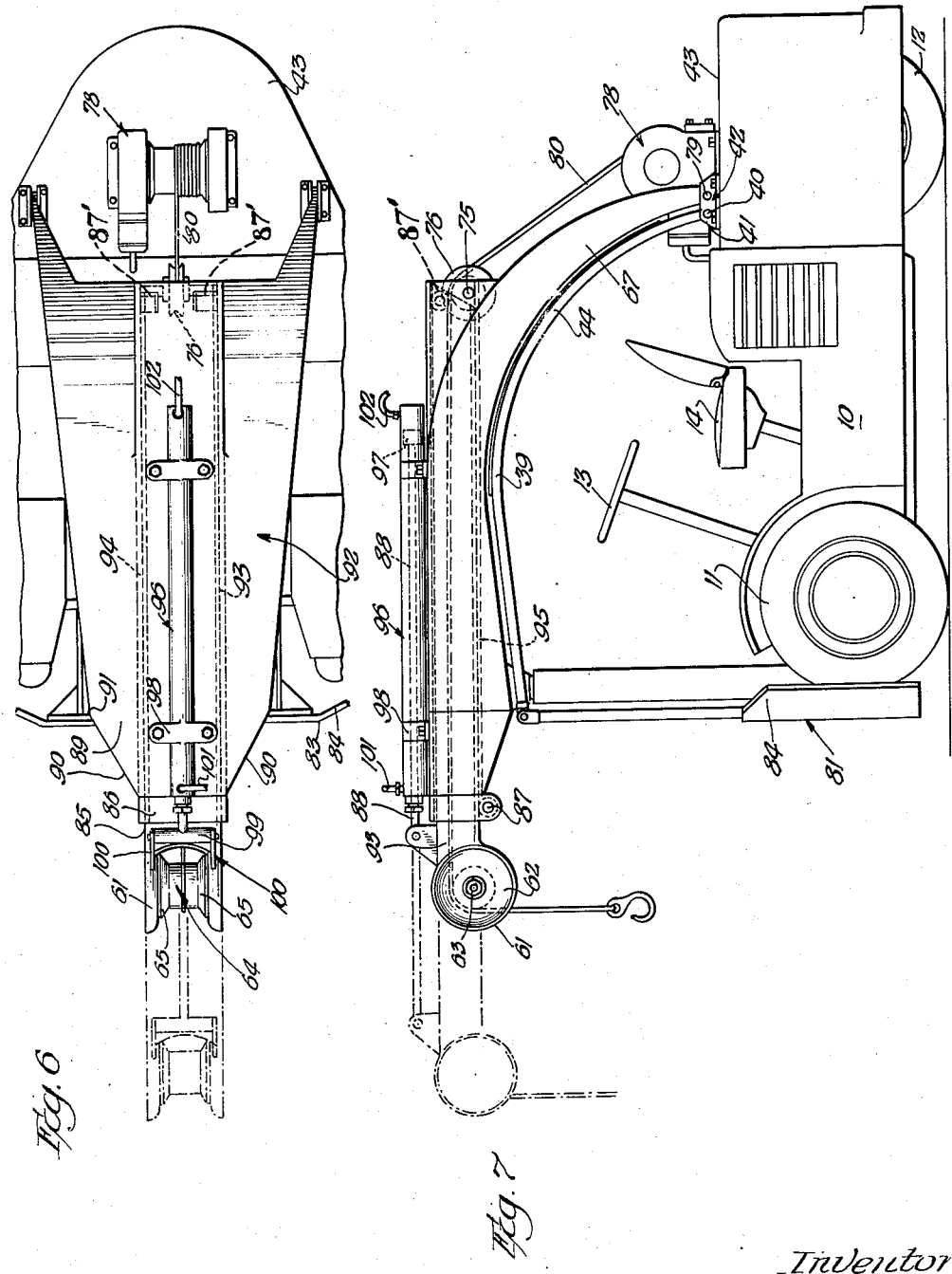
Inventor
George V. Johnson
By McCaleb, Wendt & Dickinson
Attys Patented June 6, 1950

2,510,636

UNITED STATES PATENT OFFICE 2,510,636

VEHICLE MOUNTED CRANE

George V. Johnson, Portland, Oreg., assignor to Hyster Company, Portland, Oreg., a corporation of Oregon Application July 6, 1945, Serial No. 603,552

10 Claims. (Cl. 212—8)

The present invention relates to vehicle mounted cranes, and is particularly concerned with cranes of the type having a boom mounted on a vehicle and supported upon a movable structure in front of the operator.

One of the objects of the invention is the provision of an improved vehicle mounted crane of the class described, which has the advantage of greatly increased visibility for the operator and which is so constructed that the leverage which supports the boom against vertical loads is the most favorable which can be realized upon a chassis of the size and construction shown.

Another object of the invention is the provision of an improved vehicle mounted crane of the class described which is more stable and more rigid against transverse or eccentric strains than the devices of the prior art, and which is adapted to be more safe in its operation for the driver than the devices of the prior art.

Another object of the invention is to provide a vehicle mounted crane having overhead protection and protection against the hoisting rope or cable flying against the operator if it should break, and also protection against the possibility of the operator being injured by backing into a projecting object.

In the vehicle mounted cranes of the prior art, booms have been used which were pivotally mounted by a column carried at the front end of the vehicle, the point of pivot being adjacent the rear end of the boom, but the rear end of the boom being anchored by means of an adjustable link extending from the rear end of the boom to the chassis of the vehicle.

Considerable difficulty is encountered with such devices of the prior art in manually adjusting the length of this anchoring link to adjust the height of the boom at its load-carrying end; and when so adjusted, the machines of the prior art are not adapted to pass under reasonable overhead clearances.

One of the objects of the present invention is the provision of an improved vehicle mounted crane having an improved mode of support for the boom, whereby the elevation of the load-carrying end of the boom may be adjusted by a power actuated means so that it can be lowered at any time to clear overhead obstructions and so that the machine is adapted to spot a load at any desired point within its range without moving the truck backward or forward.

Another object of the invention is the provision of an improved power controlled boom of the class described provided with a cable for supporting a load, by means of which lifting and lowering operations may be expedited.

Since the cable may be used for lifting the load just off the ground, with the beam in its lowermost position, thereafter the load may be quickly lifted and again lowered to the lowest limit of movement of the boom, without any danger of hitting the ground, the load being finally deposited by a release of the cable.

Another object of the invention is the provision of an improved vehicle mounted crane which is provided with a structure having adequate strength against side pulls, without unduly obstructing the vision of the operator.

Another object of the invention is the provision of an improved vehicle mounted crane having an extensible boom which may be extended manually or by chaining it to a pole and driving the truck away to extend or retract the pole to shorten the boom, or which may be actuated by a hydraulic cylinder and piston.

Another object of the invention is the provision of an improved vehicle mounted crane, the boom of which may be used for bumping or pushing elevated loads into place.

Another object of the invention is the provision of an improved vehicle mounted crane which is adapted to lift greater loads than the prior art machines of the same size, and which is simple and economical in its construction.

Other objects and advantages of the invention will be apparent from the following description and the accompanying drawings, in which similar characters of reference indicate similar parts throughout the several views.

Referring to the three sheets of drawings accompanying this specification,

Fig. 1 is a side elevational view of a vehicle mounted crane embodying my invention and provided with a boom of fixed length;

Fig. 2 is a fragmentary sectional view showing the mode of mounting the hydraulic piston at the base of the front apron and guard;

Fig. 3 is a fragmentary vertical sectional view showing the mode of attachment of the front vertical frame and the base plate which supports the hydraulic cylinder on the chassis of the vehicle;

Fig. 4 is a top plan view of the device of Fig. 1;

Fig. 5 is a fragmentary sectional view of the supporting structure for the hydraulic cylinder, taken on the plane of the line 5—5 of Fig. 2, looking in the direction of the arrows;

Fig. 6 is a top plan view of a modification; and

Fig. 7 is a side elevational view of the modification shown in Fig. 6.

The vehicle, which is preferably used to support the crane according to the present invention, is preferably provided with a chassis and other driving, steering, and controlling mechanism substantially similar to that disclosed in my prior applications on lift trucks, Ser. Nos. 459,905 and 475,364, filed, September 28, 1942, and February 10, 1943, respectively, which have now issued as United States Letters Patent Nos. 2,337,109 and 2,349,353, except that the vertical elevator structure and lifting arms of that lift truck have been omitted.

Thus, the automotive vehicle, which is indicated in its entirety by the numeral 10, is provided with a pair of front drive wheels 11 and a rear steered wheel 12, which is mounted in a forked supporting member that is substantially cylindrical and which has a large mass of metal on either side of the wheel 12 for providing a counter-balance.

The wheel 12 is mounted for rotation upon a vertical axis to steer the vehicle responsive to the steering wheel 13 located immediately before the operator's seat 14, and that vehicle is adapted to turn in a very limited space, as the wheel 12 may be turned to a position substantially transverse to its position shown in Fig. 1, where it is directed forwardly or rearwardly.

The drive wheels 11 are carried by shafts 15, which are each rotatably mounted in a shaft housing tube 16 (Fig. 3) that is secured to the differential housing as shown in said prior application Ser. No. 475,364 (now Patent No. 2,349,353, issued February 10, 1943).

The vertical guard structure at the front of the vehicle is indicated by the numeral 17, and it is preferably supported upon the front wheel shaft housing 16, as depicted in Fig. 3, by means of a pair of brackets 18.

One of these brackets is located adjacent each wheel, and each bracket is provided with a flat body 19 and the upper rearwardly extending arm 20 having a partially cylindrical flange 21 that is complementary to the exterior of the axle housing 16 and welded to the axle housing 16.

The chassis of the vehicle 10 is provided on each side with a forwardly extending frame member 22 having a laterally projecting stub shaft 23, which may be surrounded by a resilient tubular covering 24. The bracket 18 may have a partially cylindrical groove 25 in a laterally projecting lug 26 for supporting the stub shaft 23, which may be secured in place by means of one or more U bolts 27, the parallel legs of which pass through apertures in the lug 26 and are secured by means of nuts to clamp the tubular member 24 and shaft 23 in the groove 25.

Thus, the chassis is hung below the shaft housing 16 by means of the bracket 18. The bracket 18 may have the forward edge of its body support an integral transverse flange 28, which is provided with apertures for receiving the screw bolts 29 by means of which it is bolted to a similar transverse flange 30 carried by the gusset plate 31.

The gusset plate 31 is welded at its lower edge to a base plate 32, which has its forward edge welded to the bottom of each of the guard tubes 33 and to the bottom of a transverse frame bar 34. The frame bar 34 is also welded to the guard tubes 33. The guard tubes are cut out or recessed to receive the frame plate 34, to which the contacting edges of the cut-out portion of the guard tubes are welded.

Two of these guard tubes form the front guard structure, and these tubes extend upwardly to a point well above the head of the operator, where they may be joined by a transverse bar or frame member 35 welded to each of the tubes 33. To complete the guard frame the tubular members 33 are each provided at their upper ends with a socketed fitting 36 which has an aperture for the rivet 37, by means of which the fixture 36 is secured to a similar socketed fixture 38 that is supported on a top tube 39, forming a part of the guard.

The opposite end of each upper guard member 39 is fastened by means of a bolt or rivet 40 to the vertical flange 41 of a bracket 42, the horizontal flange of which is welded or otherwise secured to the top wall 43 of the vehicle 10. Two such brackets 42 are provided, one on each side of each tube, and faced in opposite directions, as shown in Fig. 4.

The guard members 39 preferably extend slightly upwardly from the front fixture 38 and horizontally and are downwardly curved at 44 with a substantially circular curvature over the head of the operator so that the lower rear end is located to be secured to the bracket 42.

The guard members 39 may be covered from a point above the steering wheel backwardly and downwardly to a point behind the operator and adjacent the top 43 of the chassis with a strong wire grating 39a, such as heavy expanded metal, which is welded to the guard members 39 at regularly spaced points in order to protect the driver on the seat 14.

Sufficient clearance between the front edge of the grating or screen and the bar 35 is provided so that the hydraulic piston may tilt backwardly to the desired maximum amount to lift the boom as shown in dotted lines in Fig. 1.

The transverse frame member 34 is also preferably provided with a downwardly and rearwardly sloping metal bar or plate 45 (Fig. 2) which is welded at its left edge to the frame member 34 and at its ends to the gusset members 45'. The plate 45 is provided with a centrally located aperture 46 for receiving the shank 47 of a bolt or rivet 48, which has a partially spherical head 49.

The head 49 fits in a complementary socket 50 in the lower plane end surface 51 of a hydraulic cylinder 52, which is preferably of sufficient length to extend up to the top guard fixtures 38. Hydraulic cylinder 52 is provided with an elongated piston, which is preferably in the form of a hydraulic ram 53 slidably mounted in the cylinder. The cylinder is provided with suitable packing so as to prevent the piston 53 from getting out of the cylinder 52.

At its upper end the piston 53 is provided with a partially spherical end portion 55, which fits in a complementary socket 56 in a metal member or block 57 carried by the boom 58.

The weight of the boom tends to keep the balls and sockets engaged, but accidental displacement may be prevented by means of retaining bolts at each end of the cylinder.

The vehicle is provided with the usual internal combustion engine and source of fluid under pressure, described in my prior application Ser. No. 475,364 (now Patent No. 2,349,353, issued February 10, 1943), and with similar controls for the hydraulic cylinder and piston 52, 53 as are used for the cylinder and piston in that lift truck.

The boom 58 is preferably constructed out of metal plates, welded together, as follows: The boom includes a pair of side plates 59, which are preferably shaped as shown, and which taper from the point where the block 57 is attached and the lift of the hydraulic cylinder is applied, forwardly to the point 60. Here the boom has its side plates and top plate welded to a cast metal fixture 61, comprising a pair of side members 62 provided with a shaft 63 and supporting a relatively wide, drum-like pulley 64 with outwardly tapered side flanges.

The pulley 64 is made relatively wide because in many cases the loads are lifted by means of a sling, and the wide pulley permits not only the cable and hook but the cables of the sling to be drawn up over the pulley.

The fixture 61 may also be used as a kind of bumper to push the loads around, after they have been stacked at a suitable elevation, where they could not be reached except by the use of such a boom. The two side plates 59 of the boom are joined at the top by a suitable top plate, which may extend all the way from the front to the back of the boom, and which side plates must be suitably curved to provide rear legs 67 of the boom.

The top plate 66 is tapered from the back to the front so that the boom becomes wider toward the back until the rear portion at the legs 67 is of sufficient width to be secured to the brackets 42 carried by each side of the vehicle at the back, as shown in Fig. 4.

At the rear end the top plate 66 terminates in a pair of downwardly curved leg portions 68, which comprise parts of the two legs 67. The two legs 68 may also be reinforced along their inner edges by additional upwardly extending curved plates 69 of substantially the same shape as the legs 67 and welded to the top plate and extending upwardly under the top plate at the wider portion of the boom so as to make the legs 67 of curved box shape.

The boom 58 is preferably completed by means of a bottom plate 70, which is also tapered forwardly, and which may extend backwardly and downwardly on the lower sides of the legs 67 so that the entire boom is of box-like shape and closed throughout. At its rear top widest portion the boom is preferably provided with a supporting bracket 71 for a pulley sheave.

This bracket may comprise side walls 72 and a top wall 73, the side walls being curved at their lower edges 74 and welded to the top plate 66 of the boom. The top plate 66 has a rectangular cut-out between the side flanges 72 of bracket 71 so that cable 80 may pass out between these flanges.

The side walls 72 are apertured to receive the reduced ends of a shaft 75, the central portion of which supports a pulley sheave 76. The pulley sheave 76 may be carried by an anti-friction bearing 77, which is slidably mounted on the shaft 75 so that the pulley slides from left to right as the cable winds spirally on the drum of a winch 78. The rear lower end of each leg 67 is apertured to receive a rivet or bolt 79, which pivotally mounts the lower ends of the legs of the boom 58 on the brackets 42.

The winch 78 is preferably of the type operated by a hydraulic motor, which is supplied with hydraulic fluid under pressure from the same source which provides the fluid for the hydraulic cylinder 52. This hydraulic motor (not shown) preferably drives the drum through a nonreversible worm and worm gear so that it requires no brakes or other interlocking handling gear, but is controlled solely by means of the hydraulic valve, which controls the application of hydraulic fluid to the motor.

The cable 80 has one end secured to the drum of the winch by suitable clamping devices, and it extends upwardly over the sheave 76 and is housed inside the boom 58 as it extends to the forward end of the boom. At the forward end of the boom the cable emerges and passes over the sheave 64 and is provided at its extreme end with a suitable hook or loop or other device for engagement with the load.

The front guard tubes 33 are preferably provided at their lower ends with an apron 81 in the form of a thick plate of sheet metal, which has a flat body portion 82 of sufficient width to extend laterally across the tubes 33, and which is backwardly bent at 83 on each side at an obtuse angle to provide a diagonal portion 84.

The apron 81 may be welded to the tubes 33 at spaced points, and it may also be welded at its lower edge to the base plate 32. Thus, the apron is adapted to protect the front end of the vehicle, and it serves as a bumper for pushing loads around into suitable position to be engaged by the end of the cable 80 until the load is lifted from the ground and elevated partially by means of the cable.

The mode of operation of the crane is as follows: Assuming the load in question is provided with straps or ropes which can be engaged by the hook, the hook of the cable is hooked to these binding straps or ropes, and the winch 78 is driven to wind up the cable 80 until the load is lifted from the ground and elevated partially by means of the cable. The operator may then actuate the valves which connect a source of hydraulic fluid under pressure to cylinder 52, which will cause the piston 53 to be driven outwardly, lifting the boom 58 from the full line position of Fig. 1 to the dotted line position, and holding the load at a suitable elevation, if so desired.

Then such a load may be lifted high enough to place it in the door of a railway car or to stack the load on top of a high stack or loads to be carried may be lifted sufficiently to lift them from the ground, and then they may be carried from place to place by means of the automotive vehicle, with the crane supporting the load.

The boom 58 has a three point support at the hydraulic piston 53 and the two brackets 42, and is very rigidly constructed and mounted on the vehicle so that it can withstand considerable lateral and other strains without damage.

The present vehicle can turn around in a very narrow space, and the force that is applied to lift the boom is most advantageously applied between the load and the point of pivotal attachment of the boom on the vehicle.

Referring to Figs. 6 and 7, these are views showing a similar type of vehicle mounted crane, which is provided with an extensible boom. In this case the rear end of the boom is constructed substantially as previously described, but the main body of the boom terminates at 85 slightly forwardly of the top of the hydraulic piston.

At 85 the boom is provided with a roller-supporting collar, comprising a band of metal 86 extending about the main boom section and having a pair of depending flanges provided with bearings for supporting a roller 87. The roller 87 engages the lower side of the extensible boom section so that friction between the two boom sections is reduced at this point.

Another such roller is carried by the rear end of the extensible boom section at the top for engaging the top plate of the main boom section; and this roller is indicated by the numeral 87'.

From the collar 86 the top plate 89 of this main boom section has diagonally outwardly extending edges 90 extending to the corners 91. Extending backwardly from the corners 91, the main boom section 92 of this extensible boom may be practically the same as the boom previously described, with certain additions. The sliding section 93 of the boom comprises a substantially rectangular, elongated metal box, which is adapted to be slidably received in the collar end 86 of the main boom section, and which carries at its end the pulley fixture 61 and the pulley sheave 64 previously described.

In order to guide the sliding boom section 93 even to its greatest point of extension, the inside of the main boom section 92 is provided with guide flanges 94 depending from the top plate 89, and with suitable guide plates 95 carried by the side plates of the main boom section 92 and also beneath the extensible boom member 93 to prevent it from dropping downward when it is fully telescoped, as shown in full line position in Fig. 7.

In some embodiments of the invention this sliding boom section may be moved by using the vehicle to bump the end of the boom against a wall or other fixed object when the boom is to be driven inwardly or telescoped. It may be extended by chaining the sheave 64 to a fixed object and driving the vehicle backwardly when it is not provided with separate means for actuating the sliding boom.

In the preferred form of the invention, however, the sliding boom is preferably provided with a cylinder 96 and piston 97, preferably of the two way type, for driving the boom in either direction. Thus the cylinder 96 may be secured by straps and bolts 98 to the main boom section 92.

The piston 97 may have its piston rod 88 pivotally secured by means of a cross head 99 to a pair of bracket flanges 100, which are fixedly secured to the moving boom section 93. The hydraulic fluid conduits 101 and 102 at each end of the cylinder 96 permit the application of fluid under pressure to either side of the piston.

In this case the extensible boom section may be used as a bumper or pusher for pushing a load during stacking operations without moving the vehicle, and the boom may be extended or retracted as desired by means of the hydraulic controlling valve for the cylinder 96 and piston 97.

The operation of this embodiment of the invention is substantially the same as that previously described except that it has the additional advantage that the boom is extensible so that a greater leverage or lifting force may be applied to extra heavy loads by retracting the boom and lifting the load close to the front of the vehicle.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a vehicle mounted crane, the combination of an automotive vehicle provided with a supporting frame and having a rear steered wheel and front drive wheels, said drive wheels being carried by axles mounted in an axle housing, a boom comprising a forwardly tapered member having a pair of widely spaced rear legs, said rear legs being pivotly mounted on said frame adjacent the rear end of the vehicle, and a hydraulic piston and cylinder engaging and supporting the middle portion of said boom, said hydraulic piston and cylinder being supported by said axle housing, said boom having means for attachment of a load at its extreme forward end and ahead of the vehicle, and said hydraulic cylinder and piston being extensible to lift and support the boom and the load carried thereby.

2. In a vehicle mounted crane, the combination of an automotive vehicle provided with a supporting frame and having a rear steered wheel and front drive wheels, said drive wheels being carried by axles mounted in an axle housing, a boom comprising a forwardly tapered member having a pair of widely spaced rear legs, said rear legs being pivotly mounted on said frame adjacent the rear end of the vehicle, and a hydraulic piston and cylinder engaging and supporting the middle portion of said boom, said hydraulic piston and cylinder being supported by said axle housing, said boom having means for attachment of a load at its extreme forward end and ahead of the vehicle, and said hydraulic cylinder and piston being extensible to lift and support the boom and the load carried thereby, said means for attachment of a load to the forward end of the boom comprising a sheave rotatably mounted on the forward end of the boom, a cable passing over the said sheave and through said boom, and a winch on the rear end of the vehicle to which the rear end of the cable is secured.

3. In a vehicle mounted crane, the combination of an automotive vehicle provided with a supporting frame and having a rear steered wheel and front drive wheels, said drive wheels being carried by axles mounted in an axle housing, a boom comprising a forwardly tapered member having a pair of widely spaced rear legs, said rear legs being pivotly mounted on said frame adjacent the rear end of the vehicle, and a hydraulic piston and cylinder engaging and supporting the middle portion of said boom, said hydraulic piston and cylinder being supported by said axle housing, said boom having means for attachment of a load at its extreme forward end and ahead of the vehicle, and said hydraulic cylinder and piston being extensible to lift and support the boom and the load carried thereby, said means for attachment of a load to the forward end of the boom comprising a sheave rotatably mounted on the forward end of the boom, a cable passing over the said sheave and through said boom, and a winch on the rear end of the vehicle to which the rear end of the cable is secured, said winch being located below the rear end of said boom between said legs and said boom having a sheave mounted thereon above said winch for rotational and lateral sliding movement to guide the cable as it is helically wrapped on the winch.

4. In a vehicle mounted crane, the combination of an automotive vehicle provided with a supporting frame and having a rear steered wheel and front drive wheels, said drive wheels being carried by axles mounted in an axle housing, a boom comprising a forwardly tapered member having a pair of widely spaced rear legs, said rear legs being pivotly mounted on said frame adjacent the rear end of the vehicle, and a hydraulic piston and cylinder engaging and supporting the middle portion of said boom, said hydraulic piston and cylinder being supported by said axle housing, said boom having means for attachment of a load at its extreme forward end and ahead of the vehicle, and said hydraulic cylinder and piston being extensible to lift and support the boom and the load carried thereby, said means for attachment of a load to the forward end of the boom comprising a sheave rotatably mounted on the forward end of the boom, a cable passing over the said sheave and through said boom, and a winch on the rear end of the vehicle to which the rear end of the cable is secured, said vehicle also having a pair of upper guard members attached to said frame adjacent its rear end and extending upwardly and forwardly over an operator's position at the mid portion of the frame, and a pair of downwardly extending guard members located in front of said hydraulic cylinder and attached at their upper ends to the front ends of said upper guard members, said downwardly extending guard members being secured at their lower ends to the frame.

5. In a vehicle mounted crane, the combination of an automotive vehicle provided with a supporting frame and having a rear steered wheel and front drive wheels, said drive wheels being carried by axles mounted in an axle housing, a boom comprising a forwardly tapered member having a pair of widely spaced rear legs, said rear legs being pivotly mounted on said frame adjacent the rear end of said vehicle, and a hydraulic piston and cylinder engaging and supporting the lower side of a middle portion of the boom, said hydraulic piston and cylinder being supported by said axle housing, said boom having means for attachment of a load at its extreme forward end forwardly of the vehicle, said hydraulic cylinder and piston being extensible to lift and support said boom and a load at the end thereof, said vehicle also having a pair of upper guard members attached to said frame adjacent its rear end and extending upwardly and forwardly over an operator's position at the mid portion of the frame, and a pair of downwardly extending guard members located in front of said hydraulic cylinder and attached at their upper ends to the front ends of said upper guard members, said downwardly extending guard members having their lower ends secured to the frame and being provided with a transverse front apron extending upwardly in front of the vehicle to serve to push loads and to protect the front of the vehicle.

6. In a vehicle mounted crane, the combination of an automotive vehicle having a chassis provided with a steerable rear wheel and front driving wheels, said chassis having a housing provided with a top wall, and said driving wheels being carried by axles having an axle housing, a boom comprising an elongated metal member tapered forwardly and provided at its wider rear end with a pair of separated downwardly extending legs, said legs being pivotly secured to the top wall of the vehicle housing at widely spaced points, a supporting member mounted on said axle housing and including a centrally located support for a hydraulic cylinder, a hydraulic cylinder and piston carried by said support and having engagement at its opposite end with the mid portion of said boom on the lower side thereof, and means for carrying a load at the forward end of the boom, said hydraulic cylinder and piston being extensible to move the boom upwardly for lifting the load carried at its forward end.

7. In a vehicle mounted crane, the combination of an automotive vehicle having a chassis provided with a steerable rear wheel and front driving wheels, said chassis having a housing provided with a top wall, and said driving wheels being carried by axles having an axle housing, a boom comprising an elongated metal member tapered forwardly and provided at its wider rear end with a pair of separated downwardly extending legs, said legs being pivotly secured to the top wall of the vehicle housing at widely spaced points, a supporting member mounted on said axle housing and including a centrally located support for a hydraulic cylinder, a hydraulic cylinder and piston carried by said support and having engagement at its opposite end with the mid portion of said boom on the lower side thereof, and means for carrying a load at the forward end of the boom, said hydraulic cylinder and piston being extensible to move the boom upwardly for lifting the load carried at its forward end, said means for carrying a load comprising a cable member, a sheave at the forward end of the boom over which a cable passes and a winch drum to which one end of the cable is secured.

8. In a vehicle mounted crane, the combination of an automotive vehicle having a chassis provided with a steerable rear wheel and front driving wheels, said chassis having a housing provided with a top wall, and said driving wheels being carried by axles having an axle housing, a boom comprising an elongated metal member tapered forwardly and provided at its wider rear end with a pair of separated downwardly extending legs, said legs being pivotly secured to the top wall of the vehicle housing at widely spaced points, a supporting member mounted on said axle housing and including a centrally located support for a hydraulic cylinder, a hydraulic cylinder and piston carried by said support and having engagement at its opposite end with the mid portion of said boom on the lower side thereof, and means for carrying a load at the forward end of the boom, said hydraulic cylinder and piston being extensible to move the boom upwardly for lifting the load carried at its forward end, said means for carrying a load comprising a cable member, a sheave at the forward end of the boom over which a cable passes and a winch drum to which one end of the cable is secured, and a sheave mounted for rotational and lateral sliding movement and carried by said boom near the rear end thereof and above said winch drum, whereby the latter sheave is adapted to move as the cable is wound helically upon the winch drum.

9. In a vehicle mounted crane, the combination of an automotive vehicle having a chassis provided with a steerable rear wheel and front driving wheels, said chassis having a housing provided with a top wall, and said driving wheels being carried by axles having an axle housing, a boom comprising an elongated metal member tapered forwardly and provided at its wider rear end with a pair of separated downwardly extending legs, said legs being pivotly secured to the top wall of the vehicle housing at widely spaced points, a supporting member mounted on said axle housing and including a centrally located support for a hydraulic cylinder, a hydraulic cylinder and piston carried by said support and having engagement at its opposite end with the mid portion of said boom on the lower side thereof, and means for carrying a load at the forward end of the boom, said hydraulic cylinder and piston being extensible to move the boom upwardly for lifting the load carried at its forward end, said boom being provided at its forward end with a slidably mounted telescoping section, and said boom having guides for said section.

10. In a vehicle mounted crane, the combination of an automotive vehicle having a chassis provided with a steerable rear wheel and front driving wheels, said chassis having a housing provided with a top wall, and said driving wheels being carried by axles having an axle housing, a boom comprising an elongated metal member tapered forwardly and provided at its wider rear end with a pair of separated downwardly extending legs, said legs being pivotly secured to the top wall of the vehicle housing at widely spaced points, a supporting member mounted on said axle housing and including a centrally located support for a hydraulic cylinder, a hydraulic cylinder and piston carried by said support and having engagement at its opposite end with the mid portion of said boom on the lower side thereof, and means for carrying a load at the forward end of the boom, said hydraulic cylinder and piston being extensible to move the boom upwardly for lifting the load carried at its forward end, said boom being provided at its forward end with a slidably mounted telescoping section, and said boom having guides for said section, and hydraulic means for extending and retracting said slidably mounted telescoping section with respect to the rest of the boom.

GEORGE V. JOHNSON.

REFERENCES CITED

The following references are of record in the file of this patent:

UNITED STATES PATENTS

| Number | Name | Date |
|---|---|---|
| 840,489 | Healey | Jan. 8, 1907 |
| 1,662,902 | Russell | Mar. 20, 1928 |
| 1,871,603 | Ginter | Aug. 16, 1932 |
| 1,941,952 | Nickles | Jan. 2, 1934 |
| 2,019,938 | Stephens | Nov. 5, 1935 |
| 2,301,808 | Mosher | Nov. 10, 1942 |
| 2,336,965 | Shoemaker | Dec. 14, 1943 |
| 2,368,333 | Taylor et al. | Jan. 30, 1945 |
| 2,380,069 | Peterson | July 10, 1945 |
| 2,389,872 | Ruger et al. | Nov. 27, 1945 |